US012302427B2

(12) United States Patent
Nayak et al.

(10) Patent No.: US 12,302,427 B2
(45) Date of Patent: May 13, 2025

(54) METHOD AND APPARATUS FOR QUALITY OF SERVICE TRAFFIC HANDLING UNDER NSTR CONSTRAINTS

(71) Applicant: Samsung Electronics Co., Ltd., Suwon-si (KR)

(72) Inventors: Peshal Nayak, Plano, TX (US); Rubayet Shafin, Allen, TX (US); Boon Loong Ng, Plano, TX (US); Vishnu Vardhan Ratnam, Plano, TX (US); Ahmed Atef Ibrahim Ibrahim, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 17/816,330

(22) Filed: Jul. 29, 2022

(65) Prior Publication Data
US 2023/0057502 A1    Feb. 23, 2023

Related U.S. Application Data

(60) Provisional application No. 63/303,781, filed on Jan. 27, 2022, provisional application No. 63/272,881, filed on Oct. 28, 2021, provisional application No. 63/230,589, filed on Aug. 6, 2021.

(51) Int. Cl.
*H04W 76/15*        (2018.01)
*H04W 74/08*        (2024.01)

(52) U.S. Cl.
CPC .......... *H04W 76/15* (2018.02); *H04W 74/08* (2013.01)

(58) Field of Classification Search
None
See application file for complete search history.

(56) References Cited

U.S. PATENT DOCUMENTS

| | | | |
|---|---|---|---|
| 2016/0037558 A1* | 2/2016 | Malik | H04W 72/00 370/329 |
| 2021/0076412 A1 | 3/2021 | Naribole et al. | |
| 2021/0127420 A1 | 4/2021 | Lu et al. | |
| 2021/0266891 A1 | 8/2021 | Chu et al. | |
| 2021/0337564 A1 | 10/2021 | Kwon et al. | |

(Continued)

FOREIGN PATENT DOCUMENTS

CN    112714472 A    4/2021

OTHER PUBLICATIONS

International Search Report and Written Opinion issued Nov. 16, 2022 regarding International Application No. PCT/KR2022/011516, 9 pages.

(Continued)

*Primary Examiner* — Diane L Lo

(57) ABSTRACT

Methods and apparatuses for facilitating quality of service traffic handling under NSTR constraints. A method of wireless communication performed by a non-access point (AP) multi-link device (MLD) comprises: forming a link with a corresponding AP of an AP MLD; detecting a non-simultaneous transmit and receive (NSTR) link pair; detecting that respective links of the NSTR link pair have transmit opportunity (TXOP) durations having different values; and managing communication on the respective links of the NSTR link pair based on access categories (ACs) to reduce interference between the respective links of the NSTR link pair.

18 Claims, 15 Drawing Sheets

(56) References Cited

U.S. PATENT DOCUMENTS

2021/0360547 A1*  11/2021  Wentink ............ H04W 56/0005
2022/0039183 A1    2/2022  Chu et al.
2022/0070791 A1    3/2022  Kim et al.
2022/0095401 A1    3/2022  Lu et al.
2022/0312506 A1*  9/2022  Xia ................... H04W 74/0891
2023/0029957 A1*  2/2023  Xin ................... H04W 74/0866

OTHER PUBLICATIONS

Fischer, "CR 35.3.14.3 NSTR operation", doc.: IEEE 802.11-21/1259r0, Aug. 2021, 19 pages.

Handte et al., "A TXOP rule to reduce worst-case latency", doc.: IEEE 802.11-20/1691r2, Feb. 2021, 15 pages.

Fischer, "CR 35.3.13.3 NSTR operation", doc.: IEEE 802.11-21/0558r12, May 2021, 17 pages.

Extended European Search Report issued Jul. 4, 2024 regarding Application No. 22853477.2, 8pages.

Kim et al., "TXOP limit considerations in an NSTR link pair", IEEE 802.11-21/1680r0, Oct. 2021, 11 pages.

\* cited by examiner

METHOD AND APPARATUS FOR QUALITY OF SERVICE TRAFFIC HANDLING UNDER NSTR CONSTRAINTS

CROSS-REFERENCE TO RELATED APPLICATIONS AND CLAIM OF PRIORITY

This application claims priority under 35 U.S.C. § 119(e) to U.S. Provisional Patent Application No. 63/230,589 filed on Aug. 6, 2021, U.S. Provisional Patent Application No. 63/272,881 filed on Oct. 28, 2021, and U.S. Provisional Patent Application No. 63/303,781 filed on Jan. 27, 2022, which are hereby incorporated by reference in their entirety.

TECHNICAL FIELD

This disclosure relates generally to methods and apparatuses for quality of service traffic handling under non-simultaneous transmit and receive (NSTR) constraints.

BACKGROUND

Wireless local area network (WLAN) technology allows devices to access the internet in the 2.4 GHz, 5 GHz, 6 GHz or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a key feature for next generation extremely high throughput (EHT) WI-FI systems, e.g., IEEE 802.11be. The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD.

In order to meet voice and video stream requirements over 802.11 WLAN, support for quality of service (QoS) traffic which was introduced by 802.11e and adopted in later standards provides differentiated channel access to frames belonging to different priorities. This feature considers eight different user priorities, and four access categories (ACs) are derived from these user priorities for traffic stream prioritization. User priority 1 and 2 are mapped to AC_BK, user priority 0 and 3 to AC_BE, user priority 4 and 5 to AC_VI, and user priority 6 and 7 to AC_VO. The four access categories which are supported are background (AC_BK), best effort (AC_BE), video (AC_VI) and voice (AC_VO). This feature considers an individual transmission queue for each AC wherein each queue behaves as an individual contending entity characterized by its own Enhanced Distributed Channel Access (EDCA) parameter set.

The EDCA parameter set specifies a min and max value for contention window (CW), an arbitration inter-frame spacing (AIFSN) value and a transmit opportunity (TXOP) limit. When a particular AC completes its backoff and gains channel access, the STA can perform data transmission for an amount of time that is upper bounded by TXOP. By providing a larger TXOP value for AC_VI (e.g., in a majority of cases as shown in Table 1 below), the standard intends to increase the throughput of high priority data such as video.

A summary of the EDCA parameter set element parameter values for different ACs in the 802.11 standard is shown in Table 1. As depicted, except for the case of clause 23, the four ACs have different TXOP values. Clause 23 which indicates the values introduced in IEEE 802.11ac and later adopted in the following standard documents, assigns a value of 2.528 ms for the TXOP limit for AC_BK and AC_BE, 2.080 ms for AC_VO and 4.096 for AC_VI. However, to support higher throughput for video data, the AC_VI have been assigned much higher values for the TXOP limit. Consequently, for these access categories when a station (STA) obtains channel access, it can transmit as many aggregated frames as possible while staying within the TXOP limit. Support for QoS traffic has been adopted in IEEE 802.11be as well.

TABLE 1

EDCA Parameter Set values for different access categories

| | | | | TXOP limit | | | | |
|---|---|---|---|---|---|---|---|---|
| AC | CWmin | CWmax | AIFSN | For PHYs defined in Clause 15 and Clause 16 | For PHYs defined in Clause 17, Clause 18, Clause 19, and Clause 21 | For PHY defined in Clause 22 | Clause 23 | Other PHYs |
| AC_BK | aCWmin | aCWmax | 7 | 3.264 ms | 2.528 ms | 0 | 15.008 ms | 0 |
| AC_BE | aCWmin | aCWmax | 3 | 3.264 ms | 2.528 ms | 0 | 15.008 ms | 0 |
| AC_VI | (aCWmin + 1)/2 − 1 | aCWmin | 2 | 6.016 ms | 4.096 ms | 22.56 ms (BCU: 6 or 7 MHz), 16.92 ms (BCU: 8 MHz) | 15.008 ms | 0 |
| AC_VO | (aCWmin + 1)/4 − 1 | (aCWmin + 1)/2 − 1 | 2 | 3.264 ms | 2.080 ms | 11.28 ms (BCU: 6 or 7 MHz), 8.46 ms (BCU: 8 MHz) | 15.008 ms | 0 |

SUMMARY

Embodiments of the present disclosure provide methods and apparatuses for quality of service traffic handling under NSTR constraints.

In one embodiment, a non-access point (AP) multi-link device (MLD) comprises: STAs, each comprising a transceiver configured to form a link with a corresponding AP of an AP MLD. The non-AP MLD includes a processor operably coupled to the STAs, the processor configured to: detect a NSTR link pair; detect that respective links of the NSTR link pair have TXOP durations having different values; and manage communication on the respective links of the NSTR link pair based on ACs to reduce interference between the respective links of the NSTR link pair.

In another embodiment, a method of wireless communication performed by a non-AP MLD comprises: forming a link with a corresponding AP of an AP MLD; detecting a NSTR link pair; detecting that respective links of the NSTR link pair have TXOP durations having different values; and managing communication on the respective links of the NSTR link pair based on ACs to reduce interference between the respective links of the NSTR link pair.

In another embodiment, a non-transitory computer readable medium is provided. The non-transitory computer readable medium comprises instructions that, when executed by a processor, cause the processor to: form a link with a corresponding AP of an AP MLD; detect a NSTR link pair; detect that respective links of the NSTR link pair have TXOP durations having different values; and manage communication on the respective links of the NSTR link pair based on ACs to reduce interference between the respective links of the NSTR link pair.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
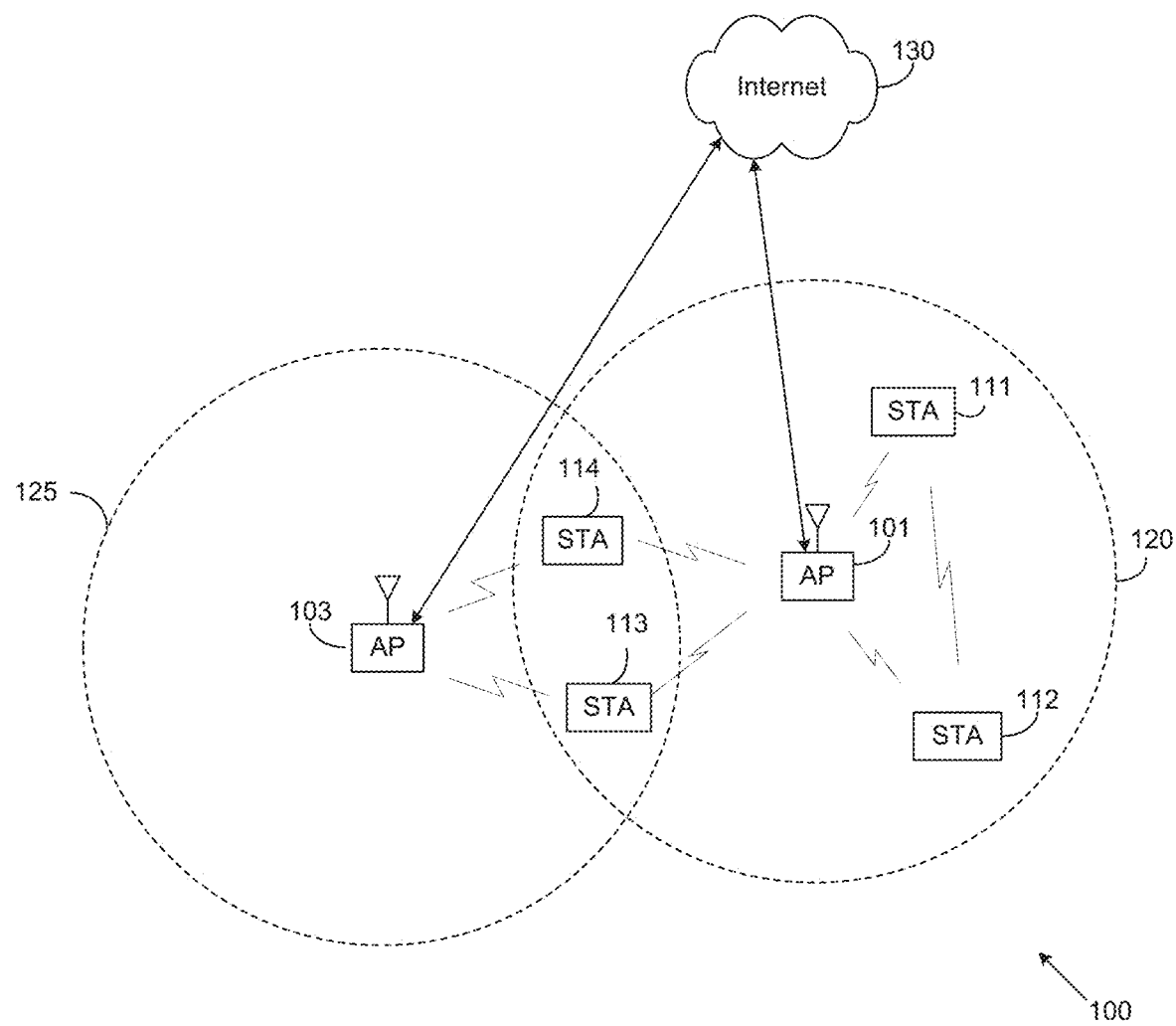
FIG. 1 illustrates an example wireless network according to various embodiments of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that, in 802.11be, a new support for multi-link operation has been introduced. Multi-link operation (MLO) allows operation over multiple links. Next generation Wi-Fi devices will be multi-link devices (MLD). An MLD can have a number of STAs affiliated with it, where each affiliated STA has a PHY interface and a lower MAC sublayer to the wireless media and a common upper MAC sublayer to communicate with the MAC-SAP. These STAs can be configured to behave as AP STAs or non-AP STAs. If all STAs are AP STAs, then the MLD is an AP MLD. Similarly, if all STAs are non-AP STAs, then the MLD is a non-AP MLD. Communication between MLDs can occur across different frequency bands/channels simultaneously and thus this operation mode has the potential to provide throughput gains compared to legacy devices.

Embodiments of the present disclosure recognize that multi-link operation has two key variants.

The first variant is STR (simultaneous transmit/receive) in which the STAs affiliated with a given multi-link device (MLD) can transmit and receive independent of each other. Here, a device can simultaneously receive/perform CCA on one link while transmitting on the other link.

The second variant is NSTR (non-simultaneous transmit/receive). If a pair of links constitute an NSTR pair, then transmission on one link can cause a signal leakage which interferes with the reception of the other link. Due to this interference, the MLD cannot transmit on one link while receiving on the other. Such devices may however be able to simultaneously receive on both links or transmit on both links. The NSTR capability of a MLD can vary over time depending on a number of factors such as the frequency separation between the links, antenna separation, chip's internal design, etc. Consequently, non-AP STAs are expected to be NSTR constrained. As a result, a realistic performance upper-bound of multi-link operation in 802.11be will be achieved in a scenario which comprises STR APs affiliated with an AP MLD connected to NSTR non-AP STAs affiliated with a non-AP MLD.

Embodiments of the present disclosure recognize that in order to avoid the interference arising from signal leakage under NSTR constraints, the start and end times of transmission (respectively, reception) on the links that constitute an NSTR link pair need to be aligned. With such an alignment, two links that constitute an NSTR link pair are either both in transmit mode or both in reception mode. Consequently, there is no impact of signal leakage from one link to the other and both links can be used simultaneously for either transmission or reception to achieve higher throughput values envisioned by 802.11be.

Embodiments of the present disclosure recognize that a harmonious operation of QoS traffic support features under NSTR constraints is important to realize the full potential of multi-link operation under diverse access category traffic in next generation 802.11be Wi-Fi networks.

Embodiments of the present disclosure recognize that when a pair of links between a first multi-link device (MLD) and a second MLD: (1) have different TXOP limits; and (2) comprise an NSTR link pair, then the data unit (DU) for the link transmission with a longer duration may be divided into two or more DUs that are transmitted as part of the same TXOP.

Embodiments of the present disclosure recognize that when a pair of links between a first multi-link device (MLD) and a second MLD: (1) have different TXOP limits; and (2) comprise an NSTR link pair, then an early TXOP termination procedure for the link transmission with a longer duration may be performed such that the transmission on both links end at the same time; and a re-contention for channel access is performed to transmit the remaining packets for the link that was terminated.

Embodiments of the present disclosure recognize that when a pair of links between a first multi-link device (MLD) and a second MLD: (1) have different TXOP limits; and (2) comprise an NSTR link pair, then transmission start time on the link having the shorter transmission may be delayed so that transmission end times on the pair of links are aligned.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using WI-FI or other WLAN communication techniques. The STAs 111-114 may communicate with each other using peer-to-peer protocols, such as Tunneled Direct Link Setup (TDLS).

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs or STAs may include circuitry and/or programming for facilitating quality of service traffic handling under NSTR constraints. For example, the AP 101 may be an AP MLD that can communicate on multiple links and the STA 101 may be a non-AP MLD that can communicate on multiple links. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
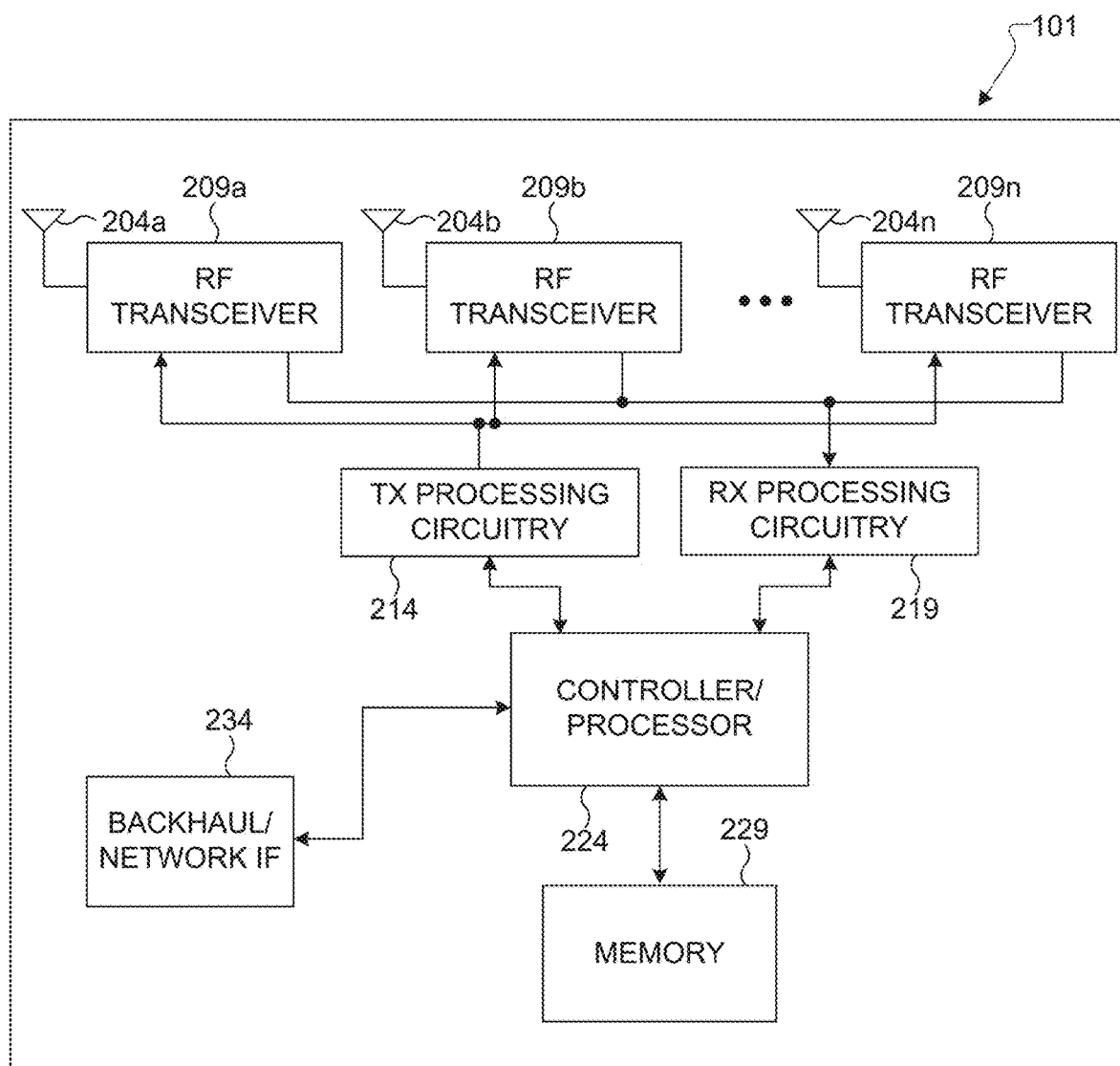
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including facilitating quality of service traffic handling under NSTR constraints. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for facilitating quality of service traffic handling under NSTR constraints. For example, the AP 101 may be an AP MLD that can communicate on multiple links. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
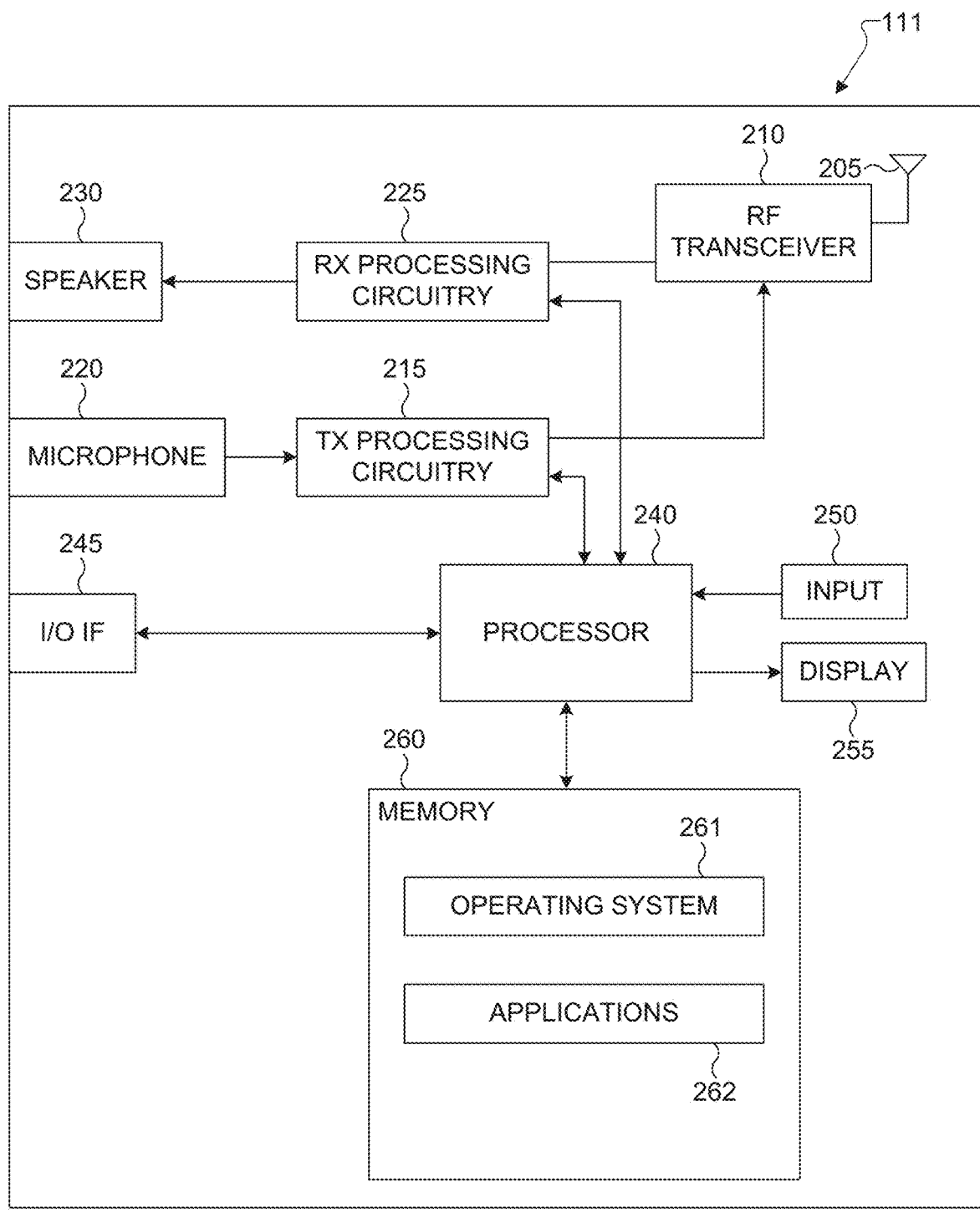
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

The STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate quality of service traffic handling under NSTR constraints. In some embodiments, the controller/processor 240 includes at least one microprocessor or microcontroller.

The controller/processor 240 is also capable of executing other processes and programs resident in the memory 260, such as operations for facilitating quality of service traffic handling under NSTR constraints. The controller/processor 240 can move data into or out of the memory 260 as required by an executing process. In some embodiments, the controller/processor 240 is configured to execute a plurality of applications 262, such as applications for detect interference from a neighboring BSS and inform the associated AP of the interference. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101 or multiple APs as a non-AP MLD that can communicate on multiple links. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

As stated previously, in order to avoid an impact of signal leakage on an ongoing transmission due to NSTR conflict between a pair of links, the start and end time of transmission (respectively, reception) on a pair of links constituting a NSTR link pair need to be aligned.

Figure 3:
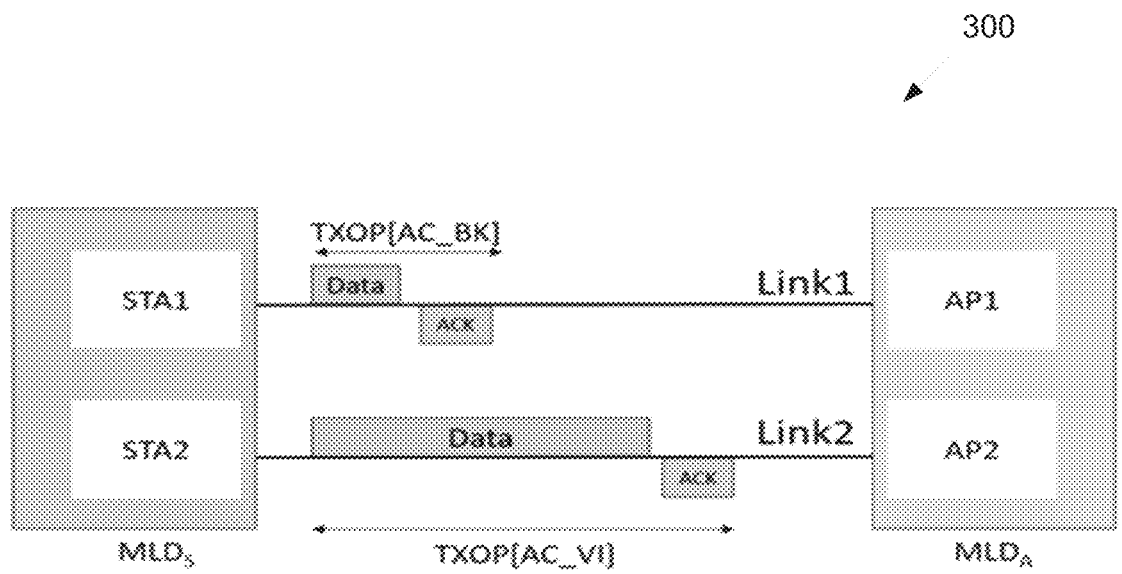
FIG. 3 illustrates an example of timing alignment arising due to diverse AC operation under NSTR constraints according to various embodiments of this disclosure.

FIG. 3 illustrates an example of timing alignment arising due to diverse AC operation under NSTR constraints 300 according to various embodiments of this disclosure. The embodiment of the timing alignment arising due to diverse AC operation under NSTR constraints 300 in FIG. 3 is for illustration only. Other embodiments of the timing alignment arising due to diverse AC operation under NSTR constraints 300 could be used without departing from the scope of this disclosure.

A problem may arise while considering the operation of QoS traffic support features under NSTR constraints as illustrated in FIG. 3. As depicted, MLDA is an AP MLD and MLDs is a non-AP MLD. AP1 and AP2 are two AP STAs affiliated with MLDA whereas STA1 and STA2 are two non-AP STAs affiliated with MLDs. Further, two links have been setup as follows. The first is setup between STA1 and AP1 over Link 1, and the second is setup between AP2 and STA2 over Link2. STA1 and STA2, which operate over Link 1 and Link 2 respectively, constitute an NSTR link pair.

While supporting QoS traffic, which AC acquires channel access for transmission from STA1 and STA2 will be determined by the outcome of the random channel access procedure. Consequently, it is possible that the AC that acquires channel access on Link1 is different from the AC that acquires channel access on Link 2. As shown in FIG. 3, the AC_BK queue in STA1 acquires the channel for transmission on Link 1 and AC_VI queue acquires the channel for transmission on Link 2. The AC_BK TXOP limit is 2.528 ms. Whereas AC_VI has a much higher TXOP limit on the order of 4.096 ms. As the transmissions of PPDUs of different ACs happen on Link 1 and Link 2, it may not be possible to maintain the timing alignment due to different TXOP limits for different ACs under the NSTR mode of operation. As shown in the example of FIG. 3, the transmission of the ACK on Link 1 occurs while Data is still being transmitted on Link 2. Therefore, the NSTR link pair is not either both in transmit mode or both in reception mode. Consequently, interference arising due to signal leakage can occur because of the downlink transmission of the ACK on Link 1 and the simultaneous uplink transmission of Data on Link 2. A similar problem could also arise for downlink transmissions for AP1 and AP2 or in a peer to peer communication setup.

As a result, to realize the full potential of multi-link operation while supporting a QoS traffic feature, a solution is needed to handle the diverse access category operation under NSTR constraints.

Figure 4:
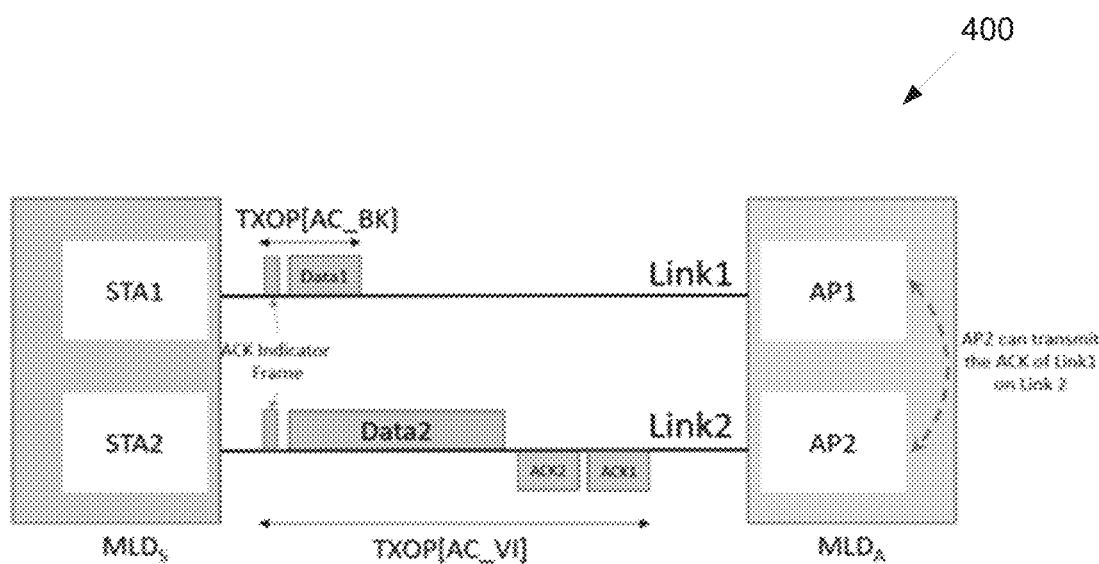
FIG. 4 illustrates an example of transmission of ACK of Link1 on Link2 according to various embodiments of this disclosure.

FIG. 4 illustrates an example of transmission of ACK of Link1 on Link2 400 according to various embodiments of this disclosure. The embodiment of the transmission of ACK of Link1 on Link2 400 in FIG. 4 is for illustration only. Other embodiments of the transmission of ACK of Link1 on Link2 400 could be used without departing from the scope of this disclosure.

In one embodiment, the transmission of the ACK (which can either be a simple ACK or block ACK of the AC transmission) that can potentially suffer an interference arising due to signal leakage under the NSTR mode of operation can be delayed until the transmission on the other link (e.g., that causes this interference) is complete. In another embodiment (e.g., as shown in FIG. 4), the ACK (which can either be a simple ACK or block ACK of the AC transmission) that can potentially suffer an interference arising due to signal leakage under the NSTR mode of operation can be transmitted on a different link. According to this embodiment, the ACK associated with AC_BK on Link 1 in FIG. 3 can be transmitted as a part of the TXOP of AC_VI on Link 2. To achieve this, STA 2 may need to adjust the data transmission time of AC_VI on Link2 to accommodate the ACK. Further, AP2 (or alternatively both AP1 and AP2) may need to be signaled about this dynamic change in the link on which the ACK needs to be transmitted. As depicted in FIG. 4, STA1 can transmit an information element (IE) to indicate to AP2 (or both AP1 and AP2) that the transmission of the ACK can be performed on Link2 following the ongoing transmission. For the ease of discussion, we denote this IE as the ACK Indicator frame. It is noted that STA1 does not transmit the ACK indicator frame to AP2. STA1 sends to AP1. STA2 sends to AP2. For MLDs, the general understanding amongst companies in the standard body is that if there are two STAs (non-AP STAs or AP STAs) affiliated with an MLD, they can share information with each other. However, some vendors could do some optimization and so all information may not be shared.

Figure 5:
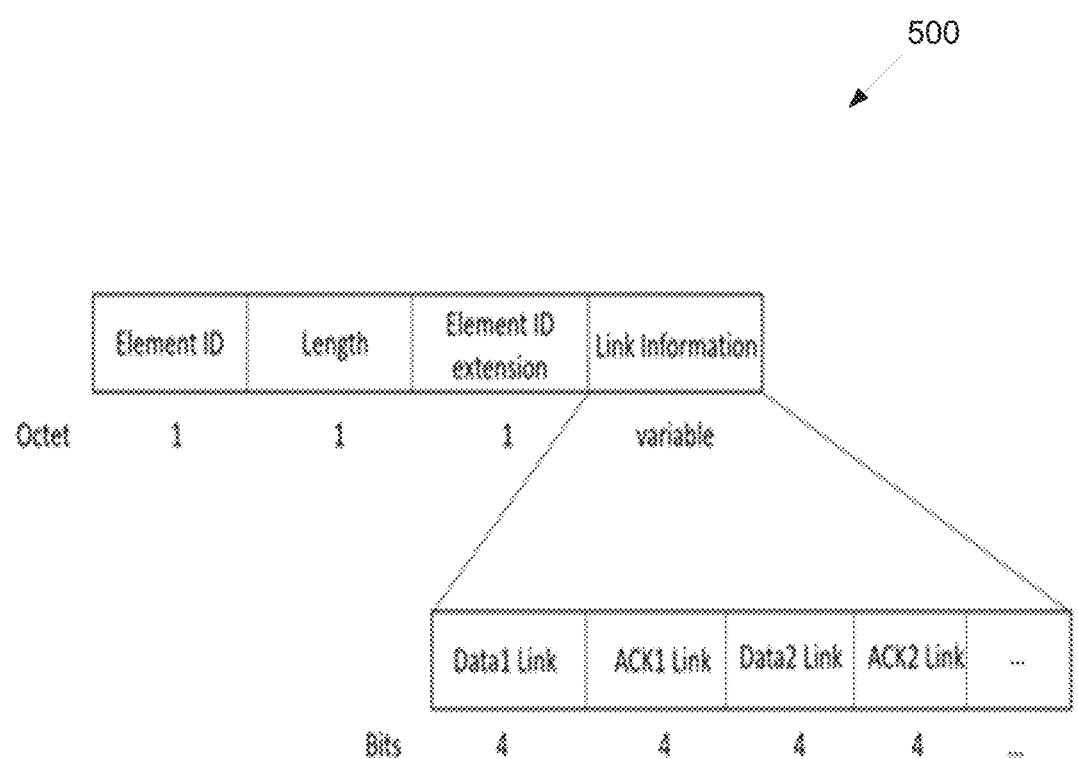
FIG. 5 illustrates an example of an ACK Indicator frame for indicating the link on which the ACK can be sent according to various embodiments of this disclosure.

FIG. 5 illustrates an example of an ACK Indicator frame for indicating the link on which the ACK can be sent 500 according to various embodiments of this disclosure. The embodiment of the ACK Indicator frame for indicating the link on which the ACK can be sent 500 in FIG. 5 is for illustration only. Other embodiments of the ACK Indicator frame for indicating the link on which the ACK can be sent 500 could be used without departing from the scope of this disclosure.

The ACK indicator can have a format as shown in FIG. 5. As depicted, the ACK indicator frame can contain a Link Information field which indicates the information about which link the ACK needs to be sent on. The Link Information field can be variable in length and can contain two types of sub-field elements:

1. Data Link sub-field: The Link ID of the link on which the data frame is being sent.
2. ACK Link sub-field: The Link ID of the link on which the STA requests the AP to send the ACK corresponding to the data frame sent on the link indicated by the preceding Data Link sub-field.

In one embodiment, the ACK indicator frame can be sent individually preceding the data frame (e.g., as shown in the example of FIG. 4). In another embodiment, the ACK indicator can be sent as a part of another frame (e.g., data frame, management frame, another IE, etc.).

According to one embodiment (e.g., as in the example of FIG. 4), for the scenario where an ACK for a data frame sent on one link (first link) between an AP MLD and a non-AP MLD is sent on another link (second link) between the same AP MLD and non-AP MLD, the AP or the non-AP STA that sends the data frame on the first link waits till it receives the corresponding ACK on the second link before the AP or the non-AP STA decides to retransmit the data frame.

Further according to this embodiment, if an ACK for a data frame sent on one link is to be sent on another link (second link) between an AP MLD and a non-AP MLD, a timer, Multi-Link ACK Timer, can be set for this process. The Multi-Link ACK Timer can start upon transmitting the last symbol of the data frame on the first link. If the ACK corresponding to the data frame sent on the first link is not received on the second link before the timer expires, the data frame transmitting AP or non-AP STA will consider the data frame to be lost (i.e., unsuccessful demodulation at the receiver) and retransmit the data frame. If the ACK for the data frame is received by the transmitter before the Multi-Link ACK Timer expires, then no retransmission is needed.

In another embodiment, when the transmission of Data 2 on link 2 fails, ACK 1 corresponding to Data 1 on link 1 can be transmitted on link 2 at the end of the timeout period corresponding to Data 2 transmission on link 2. The Multi-link ACK Timer value is less than TXOP.

Further, as shown in Table II, when TXOPs obtained on both the links belong to the same AC, the ACK can be transmitted on the same link as the link on which the corresponding Data was received. Further, when TXOPs obtained on the two links are of the same value (e.g., TXOP for both AC_BK and AC_BE is 0 as described in Table I), the ACK can be transmitted on the same link as the link on which the corresponding Data was received. Further, when the two links have TXOPs whose values are different, the ACK corresponding to the Data with the smaller TXOP can be transmitted as a part of the TXOP of the AC with the longer value as described in the above embodiments (e.g., see example shown in FIG. 4).

TABLE II

Description of the ACs on the two links and
the corresponding action that can be taken

| Link 1 | Link 2 | Comments |
|---|---|---|
| AC_BK | AC_VO | ACK of AC_BO can be transmitted on the link 2 as a part of the TXOP of AC_BK |
| AC_BK | AC_VI | ACK of AC_BK can be transmitted on the link 2 as a part of the TXOP of AC_VI |
| AC_BK | AC_BE | ACKs of each of the AC can be transmitted on the same link as the corresponding Data transmission |
| AC_BK | AC_BK | ACKs of each of the AC can be transmitted on the same link as the corresponding Data transmission |
| AC_BE | AC_VO | ACK of AC_VO can be transmitted on the link 2 as a part of the TXOP of AC_BE |
| AC_BE | AC_VI | ACK of AC_BE can be transmitted on the link 2 as a part of the TXOP of AC_VI |
| AC_BE | AC_BE | ACKs of each of the AC can be transmitted on the same link as the corresponding Data transmission |
| AC_VO | AC_VO | ACKs of each of the AC can be transmitted on the same link as the corresponding Data transmission |
| AC_VO | AC_VI | ACK of AC_VO can be transmitted on the link 2 as a part of the TXOP of AC_VI |
| AC_VI | AC_VI | ACKs of each of the AC can be transmitted on the same link as the corresponding Data transmission |

Figure 6:
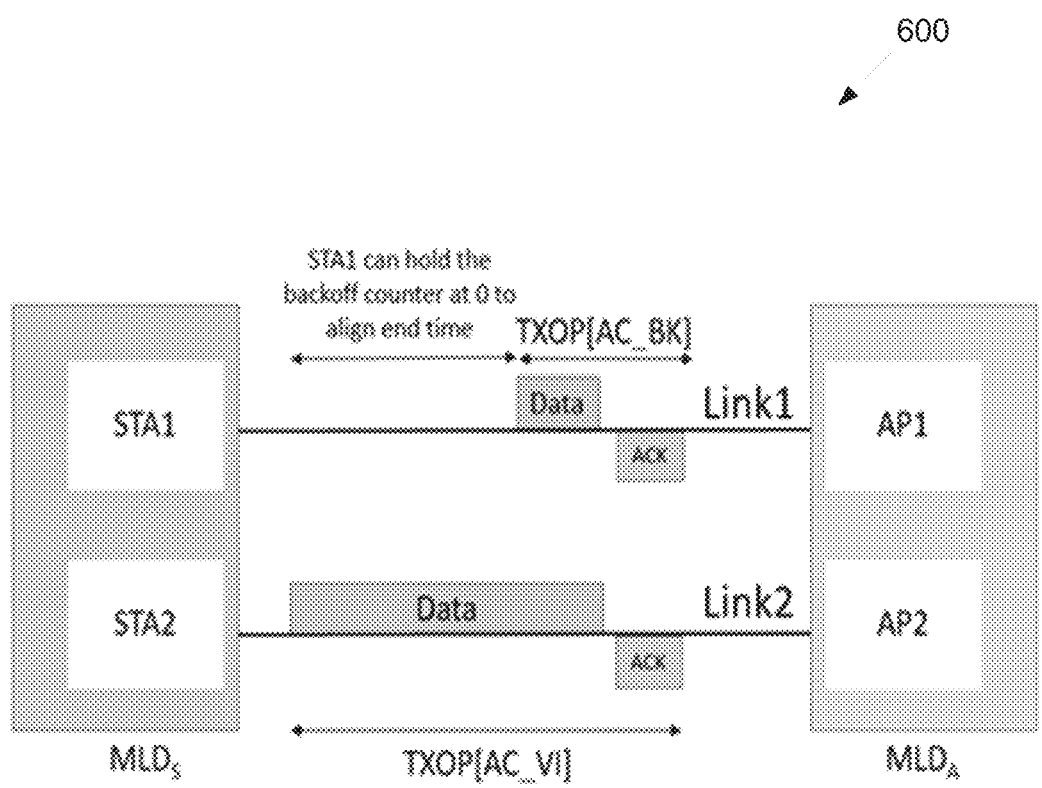
FIG. 6 illustrates an example of a start time delay procedure according to various embodiments of this disclosure.

FIG. 6 illustrates an example of a start time delay procedure 600 according to various embodiments of this disclosure. The embodiment of the start time delay procedure 600 in FIG. 6 is for illustration only. Other embodiments of the start time delay procedure 600 could be used without departing from the scope of this disclosure.

In another embodiment, as illustrated in FIG. 6, the start time of the transmission on Link 1 can be delayed such that its end time aligns with the end time of the transmission on Link 2. Further, according to this embodiment, STA 1 as shown in FIG. 5 can hold the backoff counter at 0 (as permitted by the 802.11be specification) until a point where the end time of data transmission on link 1 is aligned with the end time of data transmission on link 2.

Figure 7:
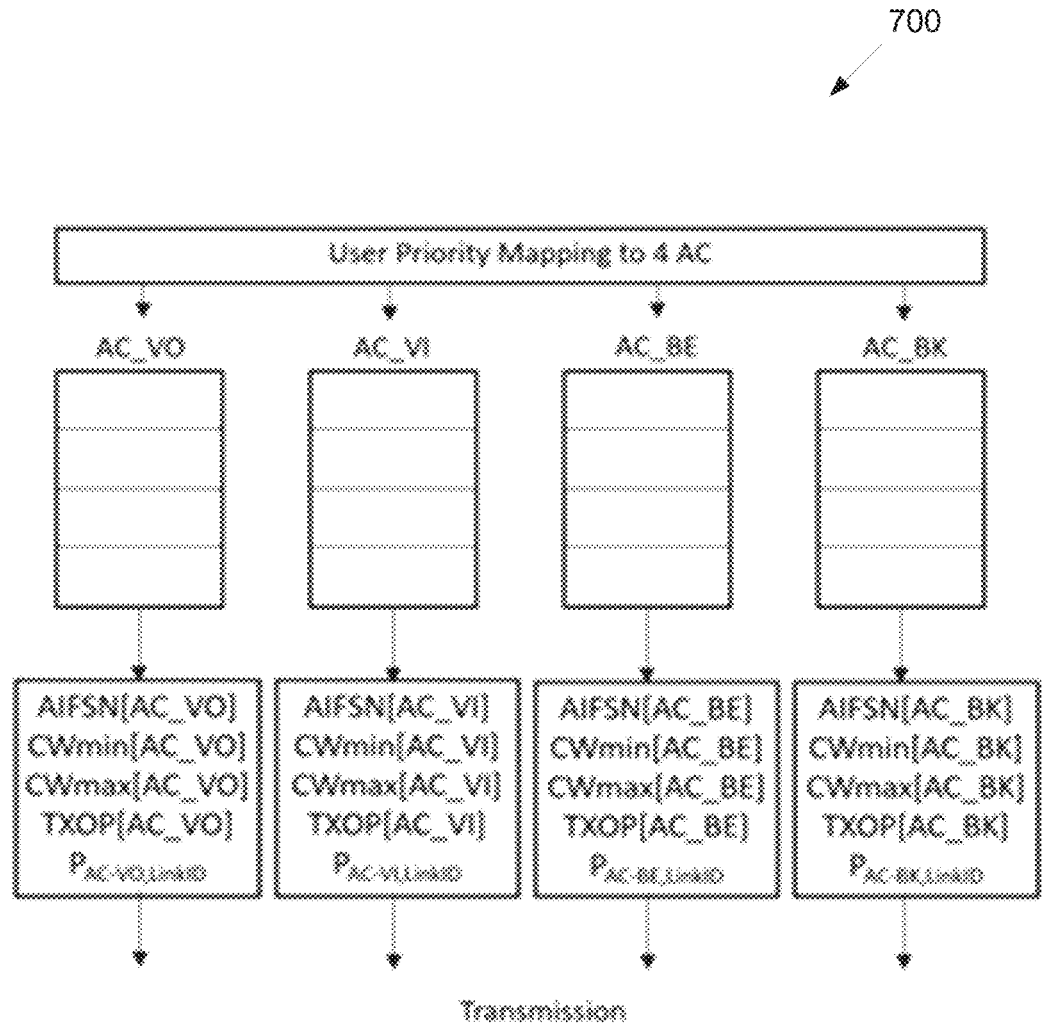
FIG. 7 illustrates an example of an EDCA parameter set for each AC on a given link according to various embodiments of this disclosure

FIG. 7 illustrates an example of an EDCA parameter set for each AC on a given link 700 according to various embodiments of this disclosure. The embodiment of the EDCA parameter set for each AC on a given link 700 in FIG. 7 is for illustration only. Other embodiments of the EDCA parameter set for each AC on a given link 700 could be used without departing from the scope of this disclosure.

In another embodiment, when the AC that acquires the channel on Link 1 via STA1 is different than the AC that acquires the channel on Link 2 via STA2, a similar AC channel access procedure can be followed by STA1 and STA2. To illustrate this, following the example depicted in FIG. 3, when the channel on Link 1 is acquired by AC_BK and the channel on Link 2 is acquired by AC_VI, the same AC can be allowed to access the channel on both the links. According to this embodiment, for each AC an additional parameter can be considered in the standard as a part of the EDCA parameter set for each AC as depicted in FIG. 7. We hereby refer to this parameter as the NSTR operation priority level. Further, this parameter would be maintained for each AC queue on each link. We hereby use the notation $P_{AC,LinkID}$ to refer to this parameter. For example, for AC_VI on Link 1 the notation used would be $P_{AC\_VI,Link1}$.

Figure 8:
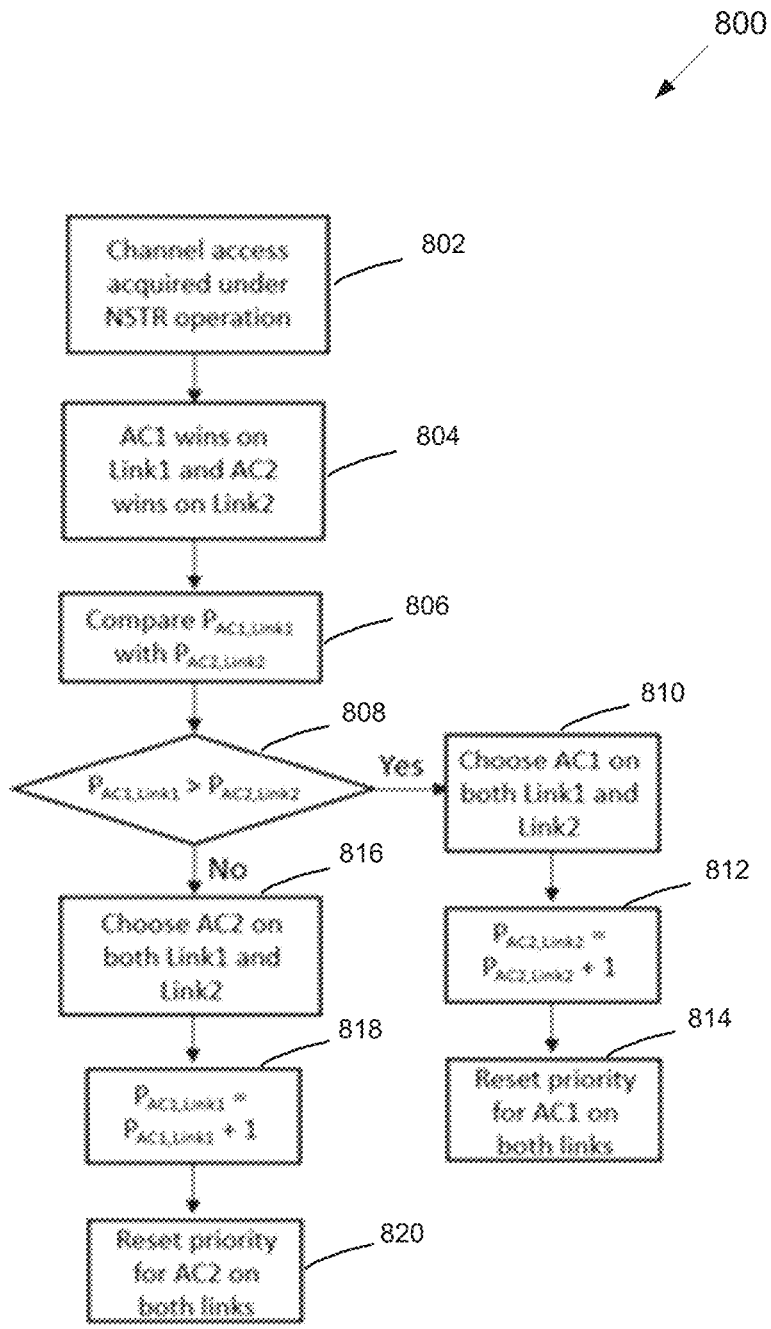
FIG. 8 illustrates an example flow chart illustrating a channel access procedure 800 according to various embodiments of this disclosure.

FIG. 8 illustrates an example flow chart illustrating a channel access procedure 800 according to various embodiments of this disclosure. The embodiment of the channel access procedure 800 in FIG. 8 is for illustration only. Other embodiments of the channel access procedure 800 could be used without departing from the scope of this disclosure.

Further, according to this embodiment the channel access procedure for QoS traffic support under NSTR constraints can be modified as shown in FIG. 8 with each STA (non-AP and AP) maintaining a priority level for each AC as depicted. Let us denote the AC that obtains channel access on Link 1 as AC1 and the AC that obtains channel access on Link2 as AC2. Then as shown in FIG. 8, upon obtaining channel access under NSTR operation, the values of $P_{AC1,\ Link1}$ can be compared with that of $P_{AC2,\ Link2}$. Assuming $P_{AC2,\ Link1} > P_{AC2,\ Link2}$, AC1 would be chosen for transmission on both Link1 and Link2.

For example, as illustrated at step 802, channel access is acquired under NSTR operation. At step 804, AC1 obtains priority on Link 1 and AC2 obtains priority on LINK 2. At step 806, $P_{AC1,\ Link1}$ is compared with $P_{AC2,\ Link2}$. At step 808, the respective values of $P_{AC1,\ Link1}$ and $P_{AC2,\ Link2}$ are compared. If the value of $P_{AC1,\ Link1}$ > the value of $P_{AC2,\ Link2}$, then: at step 810, AC1 is chosen on both Link 1 and Link 2; at step 812, the value of $P_{AC2,\ Link2}$ is set to $P_{AC2,\ Link2}+1$; and at step 814, the priority is reset for AC1 on both Link 1 and Link 2. If at step 808 the value of $P_{AC1,\ Link1}$ is not > the value of $P_{AC2,\ Link2}$, then: at step 816, AC2 is chosen on both Link 1 and Link 2; at step 818, the value of $P_{AC1,\ Link1}$ is set to $P_{AC1,\ Link1}+1$; and at step 820, the priority is reset for AC2 on both Link 1 and Link 2.

Figure 9:
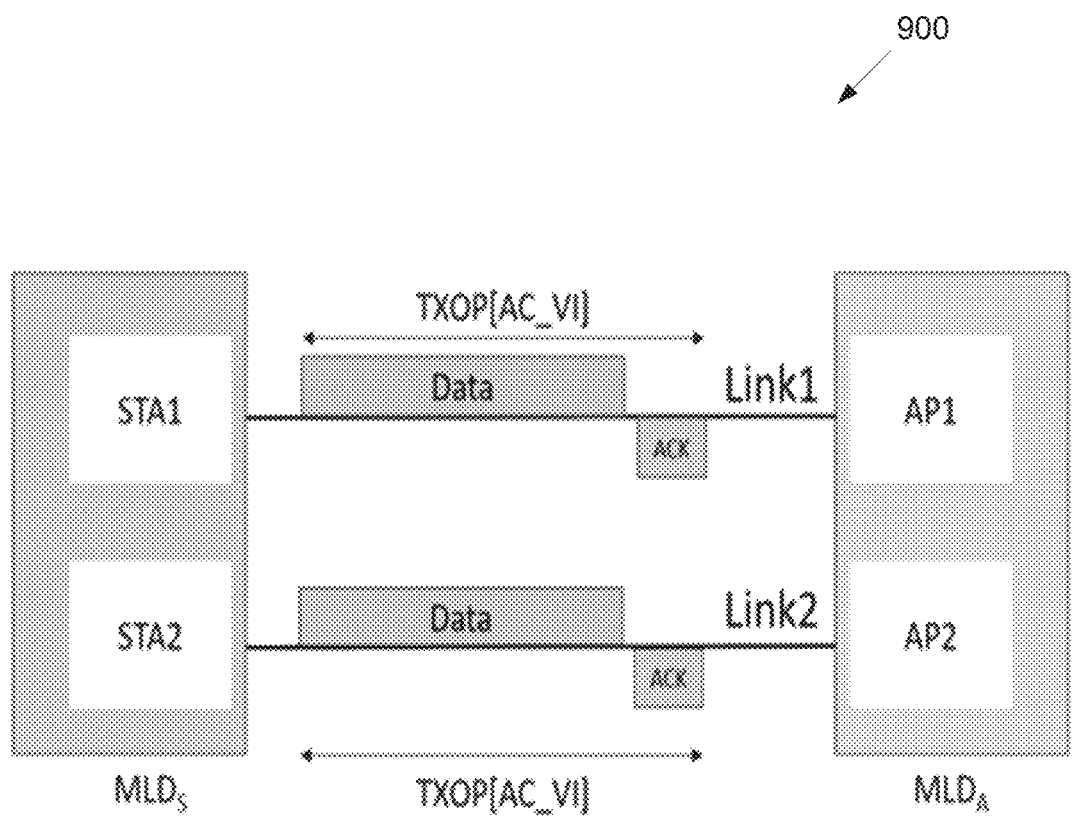
FIG. 9 illustrates an example of same AC assignment on both the links under NSTR constraint to support QoS traffic according to various embodiments of this disclosure.

FIG. 9 illustrates an example of same AC assignment on both the links under NSTR constraint to support QoS traffic 900 according to various embodiments of this disclosure. The embodiment of the same AC assignment on both the links under NSTR constraint to support QoS traffic 900 in FIG. 9 is for illustration only. Other embodiments of the same AC assignment on both the links under NSTR constraint to support QoS traffic 900 could be used without departing from the scope of this disclosure.

Therefore, as described above with reference to FIG. 8, the same AC would get assigned the channel on both the links enabling the two STAs to align the timing of the transmission as shown in FIG. 9 in accordance with the NSTR start and end time synchronization operation. It is noted that such alignment is possible because for MLD, the STAs affiliated with the same MLD are capable of performing such an alignment as they can share information with each other. However, this could result in a starvation for the waiting AC on Link2 which in this example is AC2. In order to avoid starvation for AC2 on Link2, an aging technique can be applied by incrementing the NSTR operation priority level for AC2 on Link2. As a result, the NSTR operation priority level of the waiting AC which in this case is AC2 would gradually increase each time it is put in waiting mode to resolve the NSTR conflict. Notice that as the NSTR operation priority level of the waiting AC exceeds the NSTR operation priority level of AC1, when such a scenario arises AC2 would get assigned the channel on both links avoiding any potential starvation problems. When a particular AC gets a chance to transmit, its NSTR operation priority level can be reset back to the initial value.

Figure 10:
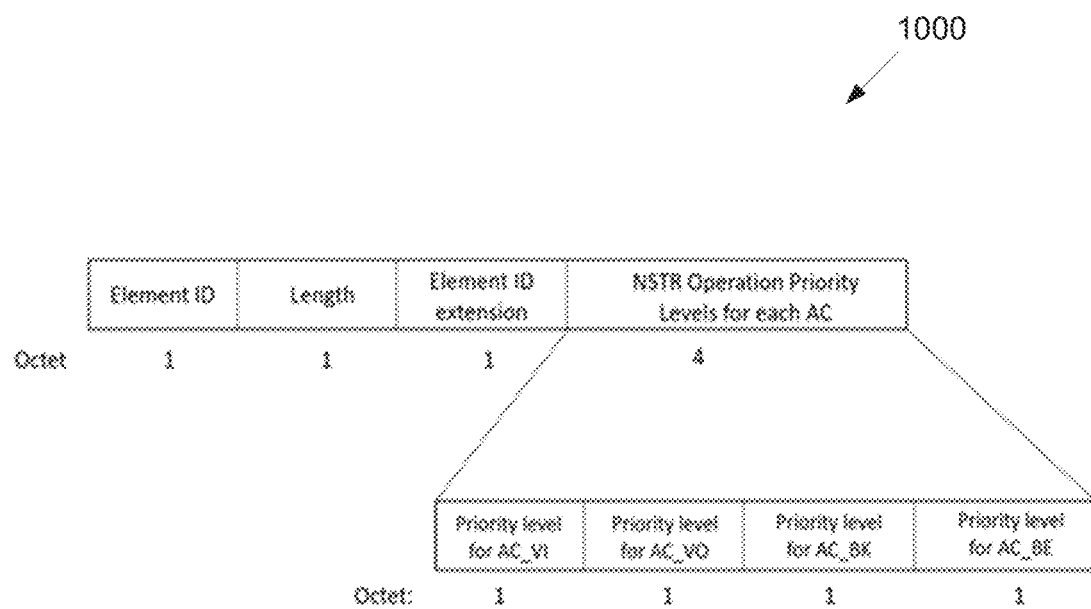
FIG. 10 illustrates an example information element for setting NSTR operation priority level according to various embodiments of this disclosure

FIG. 10 illustrates an example information element for setting NSTR operation priority level 1000 according to various embodiments of this disclosure. The embodiment of the information element for setting NSTR operation priority level 1000 in FIG. 10 is for illustration only. Other embodiments of the information element for setting NSTR operation priority level 1000 could be used without departing from the scope of this disclosure.

In one embodiment, the values for the NSTR operation priority level can be set by the AP (for the STA-side on the uplink) and the STA (for the AP-side on the downlink) and by using an information element (IE). According to this embodiment, the recommender (which can either be the STA or the AP) can send an IE as indicated in FIG. 10. This IE can contain the NSTR Operation Priority Levels for each AC. The recipient of the IE may accept or reject the recommended parameters and choose its own parameters instead. The recipient can then send back a similar IE containing the final values of the NSTR operation priority levels providing the recipient the ability to have a final say in the priority levels. As an example, if the AP sends this IE to the STA with recommendation for the NSTR operation priority level to be used for the uplink, the STA can either accept the AP's suggestions or set its own values by considering factors such as its traffic characteristics, prioritization requirements for each AC, etc. The STA can send a similar IE to the AP with the final values of the NSTR Operation priority level in response to the AP's IE. Upon receiving the IE sent by the STA, the AP can check the values of NSTR Operation priority level for various ACs which the STA has set to understand if its recommendation was accepted by the STA or not.

Figure 11:
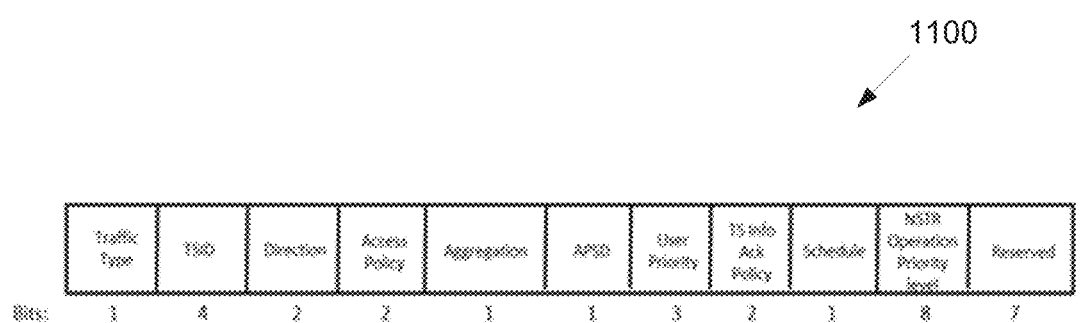
FIG. 11 illustrates an example modified TS information field format according to various embodiments of this disclosure.

FIG. 11 illustrates an example modified TS information field format 1100 according to various embodiments of this disclosure. The embodiment of the modified TS information field format 1100 in FIG. 11 is for illustration only. Other embodiments of the modified TS information field format 1100 could be used without departing from the scope of this disclosure.

In another embodiment, the values for the NSTR operation priority level can be set by the STA or the AP by using the TS Info field in the TSPEC element as shown in FIG. 11. According to this embodiment, the STA or the AP can set these values for each AC by using a new sub-field named NSTR Operation Priority level in the TS Info field format as shown in FIG. 11. The value of the sub-field will be set by considering the AC to which the TSID of the TS Info field gets mapped to.

As shown in Table III, the similar AC channel access procedure (e.g., shown in FIG. 10) can be used for the setting described in the Table. In cases where the TXOP levels are similar, the similar AC channel access procedure is not needed.

TABLE III

Condition for use of similar AC channel access procedure

| Link 1 | Link 2 | Comments |
| --- | --- | --- |
| AC_BK | AC_VO | similar AC channel access procedure can be used |
| AC_BK | AC_VI | similar AC channel access procedure can be used |
| AC_BK | AC_BE | similar AC channel access not needed |
| AC_BK | AC_BK | similar AC channel access not needed |
| AC_BE | AC_VO | similar AC channel access procedure can be used |
| AC_BE | AC_VI | similar AC channel access procedure can be used |
| AC_BE | AC_BE | similar AC channel access not needed |
| AC_VO | AC_VO | similar AC channel access not needed |
| AC_VO | AC_VI | similar AC channel access procedure can be used |
| AC_VI | AC_VI | similar AC channel access not needed |

Figure 12:
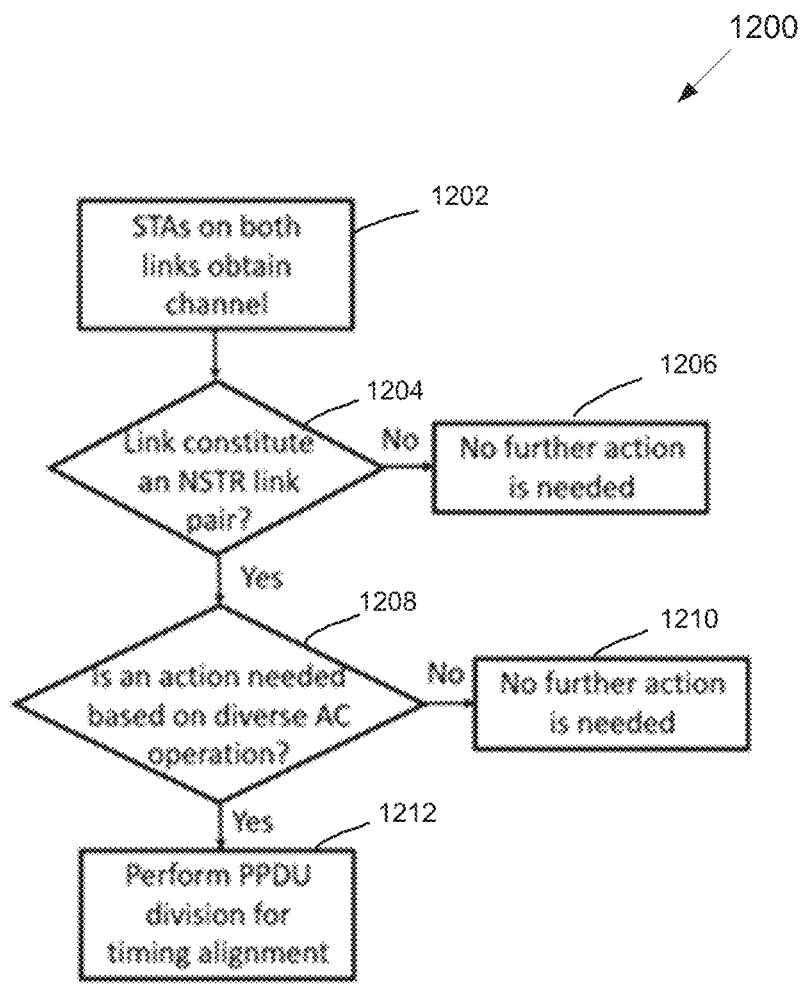
FIG. 12 illustrates an example flow chart of a PPDU division procedure according to various embodiments of this disclosure.

FIG. 12 illustrates an example flow chart of a PPDU division procedure 1200 according to various embodiments of this disclosure. The embodiment of the PPDU division procedure 1200 in FIG. 12 is for illustration only. Other embodiments of the PPDU division procedure 1200 could be used without departing from the scope of this disclosure.

Figure 13:
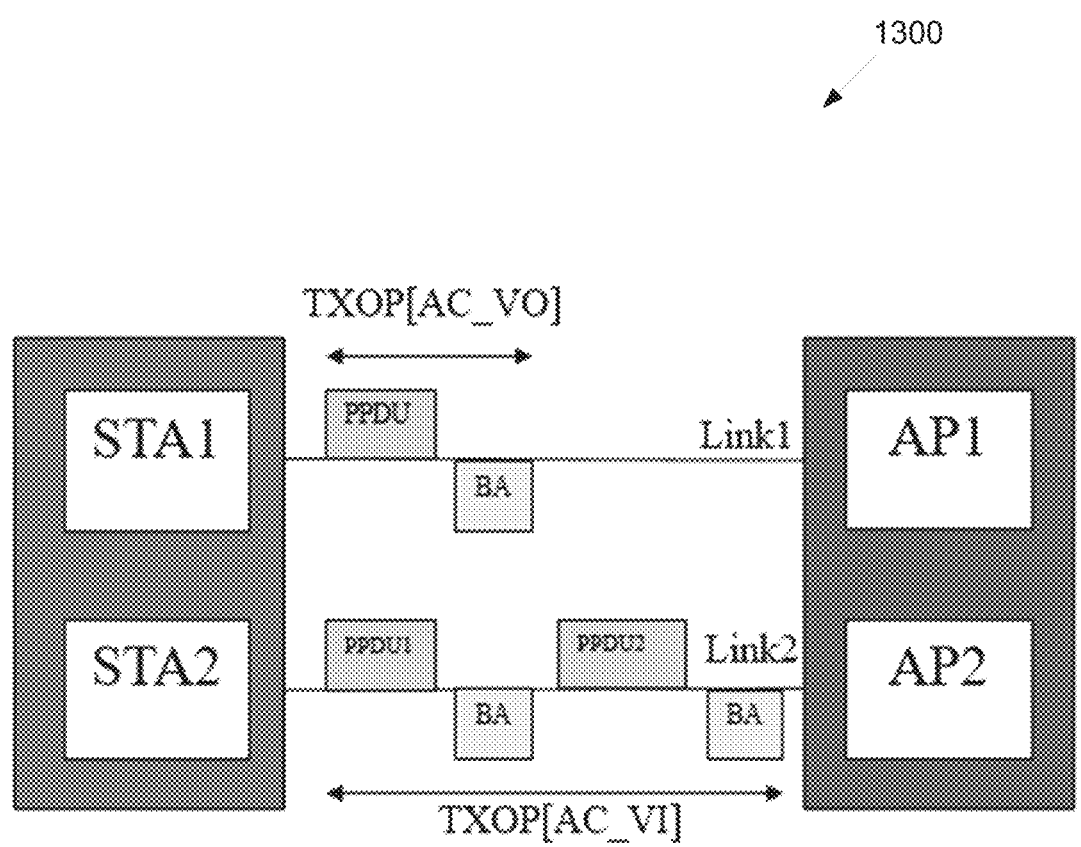
FIG. 13 illustrates an example that depicts a PPDU division procedure according to various embodiments of this disclosure.

FIG. 13 illustrates an example that depicts a PPDU division procedure 1300 according to various embodiments of this disclosure. The embodiment of the PPDU division procedure 1300 in FIG. 13 is for illustration only. Other embodiments of the PPDU division procedure 1300 could be used without departing from the scope of this disclosure.

In another embodiment, the frames transmitted in the PPDU with the longer transmission time can be divided into two or more PPDUs transmitted as a part of the same TXOP as depicted in FIG. 12 and illustrated in FIG. 13. The PPDU breakdown can be performed such that their durations are the same and start and end times are aligned with each other. Such information can be exchanged between STAs affiliated with the same MLD. The condition used to perform this division is as described in Table IV.

TABLE IV

Condition and action for division of frames into two or more PPDUs

| Link 1 | Link 2 | Action |
| --- | --- | --- |
| AC_BK | AC_VO | Perform PPDU division for AC_BK transmission |
| AC_BK | AC_VI | Perform PPDU division for AC_VI transmission |
| AC_BK | AC_BE | — |
| AC_BK | AC_BK | — |
| AC_BE | AC_VO | Perform PPDU division for AC_BE transmission |
| AC_BE | AC_VI | Perform PPDU division for AC_VI transmission |
| AC_BE | AC_BE | — |
| AC_VO | AC_VO | — |
| AC_VO | AC_VI | Perform PPDU division for the transmission with longer duration |
| AC_VI | AC_VI | — |

As shown in Table IV, when TXOPs obtained on both the links belong to the same AC and the transmissions are of equal duration or of durations where the difference can be resolved by using padding as allowed by the 802.11be specification, no PPDU division is needed. Further, according to this embodiment, when TXOPs obtained on the two links are of the same value (e.g., the TXOP for both AC_BK and AC_BE is 2.528 ms as described in Table I) and the transmissions are of the same duration, PPDU division may not be performed. Further, according to this embodiment, when the two links have TXOPs whose values are different, a PPDU division can be performed for the PPDU that corresponds to the longer TXOP. Further, in the case where the transmissions corresponding to the ACs are of different durations compared to their TXOPs, a PPDU division can be performed.

For example, as illustrated in FIG. 12, at step 1202, STAs on both links obtain the channel. At step 1204, a determination is made whether the link constitutes an NSTR link pair. If the link does not constitute an NSTR link pair, then at step 1206, no further action is needed. If the link does constitute an NSTR link pair, then at step 1208, a determination is made whether an action is needed based on diverse AC operation. If an action is not needed based on diverse AC operation, then at step 1210, no further action is needed. If an action is needed based on diverse AC operation, then at step 1212, PPDU division is performed for timing alignment.

All the above embodiments can be applied for the downlink as well in a straightforward, analogous manner.

Figure 14:
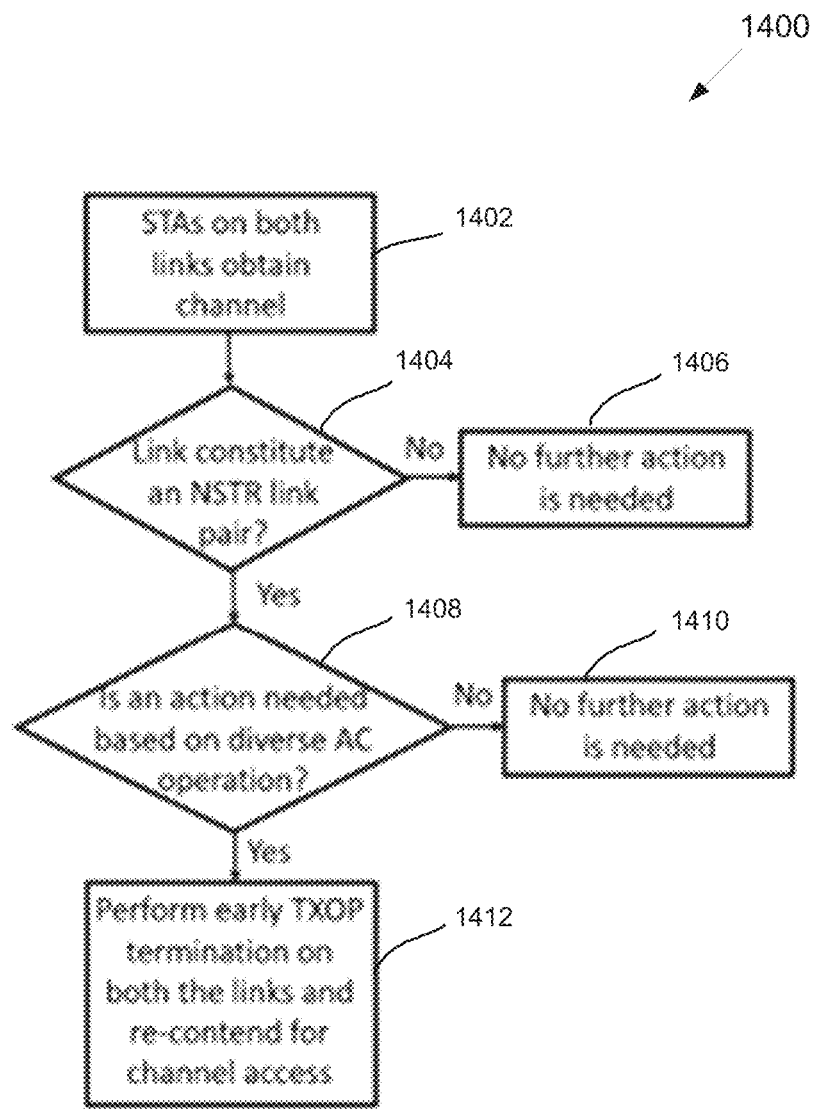
FIG. 14 illustrates an example flow chart of an early TXOP termination and re-contention procedure according to various embodiments of this disclosure.

FIG. 14 illustrates an example flow chart of an early TXOP termination and re-contention procedure 1400 according to various embodiments of this disclosure. The embodiment of the early TXOP termination and re-contention procedure 1400 in FIG. 14 is for illustration only. Other embodiments of the early TXOP termination and re-contention procedure 1400 could be used without departing from the scope of this disclosure.

Figure 15:
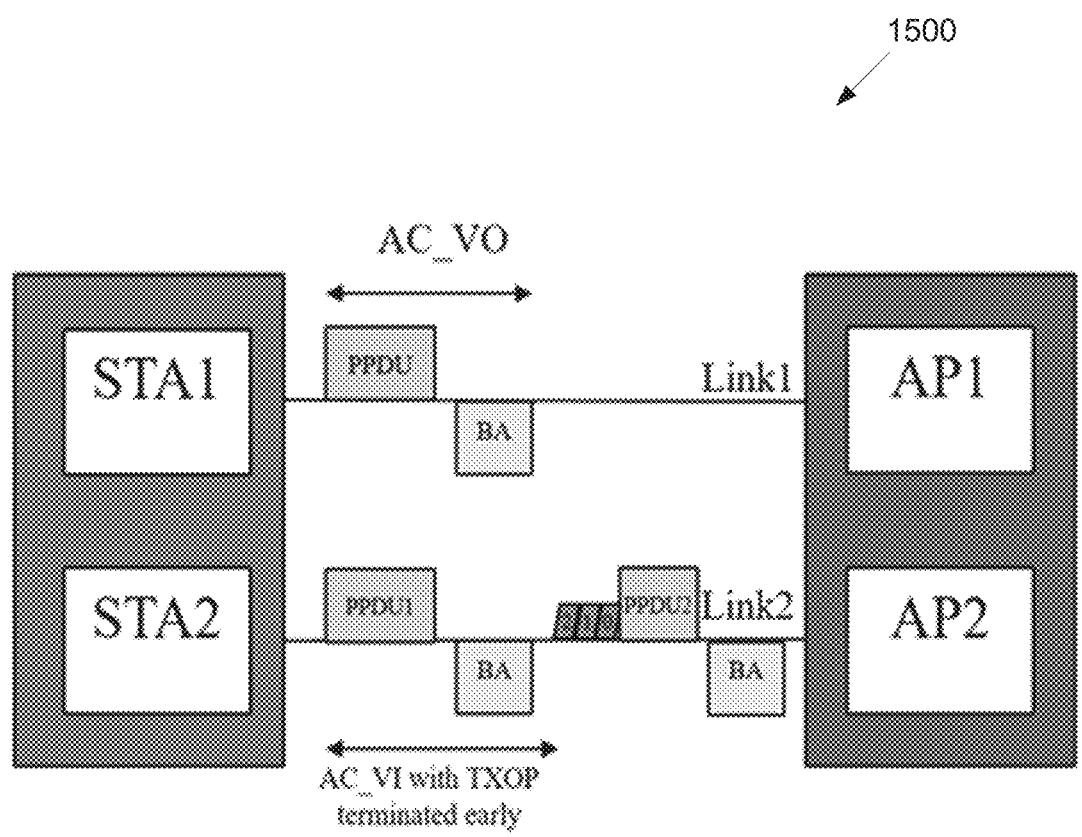
FIG. 15 illustrates an example that depicts an early TXOP termination and re-contention procedure according to various embodiments of this disclosure.

FIG. 15 illustrates an example that depicts an early TXOP termination and re-contention procedure 1500 according to various embodiments of this disclosure. The embodiment of the early TXOP termination and re-contention procedure 1500 in FIG. 15 is for illustration only. Other embodiments of the early TXOP termination and re-contention procedure 1500 could be used without departing from the scope of this disclosure.

In another embodiment, as depicted in FIG. 14 and illustrated in FIG. 15, STA2 affiliated with MLDs can end its transmission on Link 2 such that its end time is aligned with the transmission from STA1 on Link 1. Following this, STA2 can terminate its TXOP. The STAs affiliated with the same MLD can communication necessary information such as transmission end time on link 1 for determining when to terminate the TXOP. The remainder of the packets belonging to the AC that STA2 was transmitting on Link 2 can be transmitted by STA2 after contending for channel access again. For this second transmission, the start time can be aligned with the start time of the transmission on Link 1 using the procedure for start time alignment specified in the 802.11be standard. Table V shows respective early termination and re-contention actions and their corresponding conditions on Link 1 and Link 2.

TABLE V

Condition and action for early TXOP termination and re-contention based embodiment

| Link 1 | Link 2 | Action |
| --- | --- | --- |
| AC_BK | AC_VO | Early termination and re-contention for AC_BK transmission |
| AC_BK | AC_VI | Early termination and re-contention for AC_VI transmission |
| AC_BK | AC_BE | — |
| AC_BK | AC_BK | — |
| AC_BE | AC_VO | Early termination and re-contention for AC_BE transmission |

TABLE V-continued

Condition and action for early TXOP termination and re-contention based embodiment

| Link 1 | Link 2 | Action |
| --- | --- | --- |
| AC_BE | AC_VI | Early termination and re-contention for AC_VI transmission |
| AC_BE | AC_BE | — |
| AC_VO | AC_VO | — |
| AC_VO | AC_VI | Early termination and re-contention for the transmission with longer duration |
| AC_VI | AC_VI | — |

Figure 16:
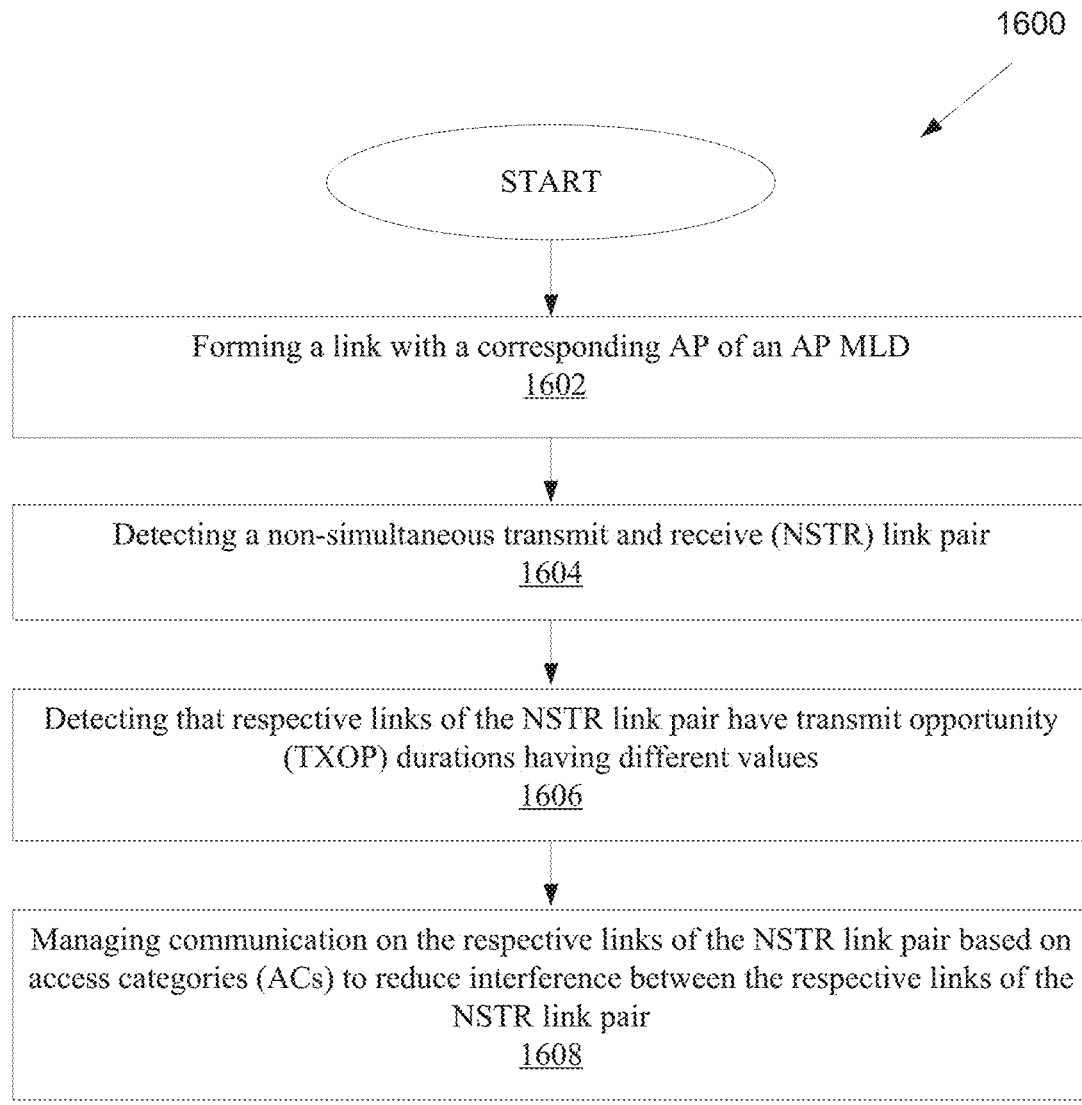
FIG. 16 illustrates a flow chart of a method of wireless communication performed by a non-AP MLD according to various embodiments of this disclosure.

FIG. 16 illustrates a flow chart of a method 1600 of wireless communication performed by a non-AP MLD, as may be performed by a non-AP MLD such as STA 111, according to embodiments of the present disclosure. The embodiment of the method 1600 illustrated in FIG. 16 is for illustration only. FIG. 16 does not limit the scope of this disclosure to any particular implementation.

As illustrated in FIG. 16, the method 1600 begins at step 1602. In step 1802, the non-AP MLD (e.g., 111-114 as illustrated in FIG. 1) forms a link with a corresponding AP of an AP MLD.

In step 1604, the non-AP MLD detects a non-simultaneous transmit and receive (NSTR) link pair.

In step 1606, the non-AP MLD detects that respective links of the NSTR link pair have transmit opportunity (TXOP) durations having different values.

In step 1608, the non-AP MLD manages communication on the respective links of the NSTR link pair based on access categories (ACs) to reduce interference between the respective links of the NSTR link pair.

In one embodiment, the non-AP MLD determines the respective link of the NSTR link pair having a longer data unit (DU) duration based on the ACs; and divides the DU for the respective link having the longer DU duration into two or more DUs that are configured to be transmitted as part of a same TXOP.

In one embodiment, the two or more DUs comprise a first DU having a same duration as a DU duration of a DU of the other respective link of the NSTR link pair.

In one embodiment, the non-AP MLD aligns respective start and end times of the first DU and the DU of the other respective link.

In one embodiment, the non-AP MLD determines the respective link of the NSTR link pair having a longer data unit (DU) duration based on the ACs; and performs early TXOP termination for the respective link of the NSTR link pair having the longer DU duration such that transmissions on the respective links of the NSTR link pair end at a same time.

In one embodiment, the non-AP MLD recontends for channel access to transmit remaining packets for the respective link of the NSTR link pair having the longer DU duration that was terminated early.

In one embodiment, the non-AP MLD determines the respective link of the NSTR link pair having a shorter data unit (DU) duration based on the ACs; and delays a transmission start time on the respective link of the NSTR link pair having the shorter DU duration such that transmissions on the respective links of the NSTR link pair end at a same time.

The above flowcharts illustrate example methods that can be implemented in accordance with the principles of the present disclosure and various changes could be made to the methods illustrated in the flowchart. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) multi-link device (MLD), comprising:
   stations (STAs), each comprising a transceiver configured to form a link with a corresponding AP of an AP MLD; and
   a processor operably coupled to the STAs, the processor configured to:
   detect a non-simultaneous transmit and receive (NSTR) link pair;
   detect that respective links of the NSTR link pair have transmit opportunity (TXOP) durations having different values; and
   manage communication on the respective links of the NSTR link pair based on access categories (ACs) to reduce interference between the respective links of the NSTR link pair,
   wherein to manage the communication on the respective links of the NSTR link pair, the processor is configured to:
   determine the respective link of the NSTR link pair having a longer data unit (DU) duration based on the ACs; and
   divide the DU for the respective link having the longer DU duration into two or more DUs that are configured to be transmitted as part of a same TXOP.

2. The non-AP MLD of claim 1, wherein the two or more DUs comprise a first DU having a same duration as a DU duration of a DU of the other respective link of the NSTR link pair.

3. The non-AP MLD of claim 2, wherein the processor is configured to align respective start and end times of the first DU and the DU of the other respective link.

4. The non-AP MLD of claim 1, wherein to manage the communication on the respective links of the NSTR link pair, the processor is configured to:
   perform early TXOP termination for the respective link of the NSTR link pair having the longer DU duration such that transmissions on the respective links of the NSTR link pair end at a same time.

5. The non-AP MLD of claim 4, wherein the processor is configured to recontend for channel access to transmit remaining packets for the respective link of the NSTR link pair having the longer DU duration that was terminated early.

6. The non-AP MLD of claim 1, wherein to moderate communication on respective links of the NSTR link pair, the processor is configured to:
   determine the respective link of the NSTR link pair having a shorter data unit (DU) duration based on the ACs; and
   delay a transmission start time on the respective link of the NSTR link pair having the shorter DU duration such that transmissions on the respective links of the NSTR link pair end at a same time.

7. A method of wireless communication performed by a non-access point (AP) multi-link device (MLD), the method comprising:
   forming a link with a corresponding AP of an AP MLD;
   detecting a non-simultaneous transmit and receive (NSTR) link pair;
   detecting that respective links of the NSTR link pair have transmit opportunity (TXOP) durations having different values;
   managing communication on the respective links of the NSTR link pair based on access categories (ACs) to reduce interference between the respective links of the NSTR link pair;
   determining the respective link of the NSTR link pair having a longer data unit (DU) duration based on the ACs; and
   dividing the DU for the respective link having the longer DU duration into two or more DUs that are configured to be transmitted as part of a same TXOP.

8. The method of claim 7, wherein the two or more DUs comprise a first DU having a same duration as a DU duration of a DU of the other respective link of the NSTR link pair.

9. The method of claim 8, further comprising aligning respective start and end times of the first DU and the DU of the other respective link.

10. The method of claim 7, further comprising:
    performing early TXOP termination for the respective link of the NSTR link pair having the longer DU duration such that transmissions on the respective links of the NSTR link pair end at a same time.

11. The method of claim 10, further comprising recontending for channel access to transmit remaining packets for the respective link of the NSTR link pair having the longer DU duration that was terminated early.

12. The method of claim 7, further comprising:
    determining the respective link of the NSTR link pair having a shorter data unit (DU) duration based on the ACs; and
    delaying a transmission start time on the respective link of the NSTR link pair having the shorter DU duration such that transmissions on the respective links of the NSTR link pair end at a same time.

13. A non-transitory computer readable medium comprising instructions that, when executed by a processor of a non-access point (AP) multi-link device (MLD), cause the non-AP MLD to:
    form a link with a corresponding AP of an AP MLD;
    detect a non-simultaneous transmit and receive (NSTR) link pair;
    detect that respective links of the NSTR link pair have transmit opportunity (TXOP) durations having different values;
    manage communication on the respective links of the NSTR link pair based on access categories (ACs) to reduce interference between the respective links of the NSTR link pair;
    determine the respective link of the NSTR link pair having a longer data unit (DU) duration based on the ACs; and
    divide the DU for the respective link having the longer DU duration into two or more DUs that are configured to be transmitted as part of a same TXOP.

14. The non-transitory computer readable medium of claim 13, wherein the two or more DUs comprise a first DU having a same duration as a DU duration of a DU of the other respective link of the NSTR link pair.

15. The non-transitory computer readable medium of claim 14, further comprising instructions that, when executed by the processor, cause the non-AP MLD to align respective start and end times of the first DU and the DU of the other respective link.

16. The non-transitory computer readable medium of claim 13, further comprising instructions that, when executed by the processor, cause the non-AP MLD to perform early TXOP termination for the respective link of the NSTR link pair having the longer DU duration such that transmissions on the respective links of the NSTR link pair end at a same time.

17. The non-transitory computer readable medium of claim 16, further comprising instructions that, when executed by the processor, cause the non-AP MLD to recontend for channel access to transmit remaining packets for the respective link of the NSTR link pair having the longer DU duration that was terminated early.

18. The non-transitory computer readable medium of claim 13, further comprising instructions that, when executed by the processor, cause the non-AP MLD to:
   determine the respective link of the NSTR link pair having a shorter data unit (DU) duration based on the ACs; and
   delay a transmission start time on the respective link of the NSTR link pair having the shorter DU duration such that transmissions on the respective links of the NSTR link pair end at a same time.

* * * * *